(12) United States Patent
Beer et al.

(10) Patent No.: US 7,752,785 B2
(45) Date of Patent: Jul. 13, 2010

(54) LICENSE PLATE HOLDER FOR A MOTOR VEHICLE

(75) Inventors: Adrian Beer, Boeblingen (DE); Markus Keller, Leonberg (DE); Heinz-Arno Kruschhausen, Wiernsheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 337 days.

(21) Appl. No.: 11/488,664

(22) Filed: Jul. 19, 2006

(65) Prior Publication Data

US 2007/0028490 A1 Feb. 8, 2007

(30) Foreign Application Priority Data

Jul. 20, 2005 (DE) ............. 10 2005 033 873

(51) Int. Cl.
*G09F 7/00* (2006.01)

(52) U.S. Cl. .............. 40/209; 40/200; 24/DIG. 57

(58) Field of Classification Search ......... 40/209; 403/349; 24/DIG. 60, DIG. 57, DIG. 56, 24/DIG. 53, 109, 297, 453; 411/913; 293/117
See application file for complete search history.

(56) References Cited

U.S. PATENT DOCUMENTS

| 1,248,043 | A | * | 11/1917 | Ware ................ 40/209 |
| 1,465,944 | A | * | 8/1923 | Latta ................ 40/209 |
| 1,589,681 | A | * | 6/1926 | Carlson et al. ............ 40/591 |
| 1,821,053 | A | * | 9/1931 | Dietz et al. ............ 40/202 |
| 1,876,405 | A | * | 9/1932 | Enscott ............ 40/618 |
| 2,831,280 | A | * | 4/1958 | McCulley ............ 40/200 |
| 3,685,188 | A | | 8/1972 | Syversen |
| 3,800,369 | A | * | 4/1974 | Nikolits et al. ............ 24/590.1 |
| 4,392,279 | A | * | 7/1983 | Schwager ............ 24/595.1 |
| 4,429,938 | A | * | 2/1984 | Flor ............ 439/314 |
| 4,691,457 | A | * | 9/1987 | Peroni ............ 40/768 |
| 4,765,077 | A | * | 8/1988 | Rosenthal et al. ............ 40/308 |
| 4,878,792 | A | * | 11/1989 | Frano ............ 411/339 |
| 4,917,426 | A | | 4/1990 | Copp |

(Continued)

FOREIGN PATENT DOCUMENTS

AT 006 270 U1 7/2003

(Continued)

OTHER PUBLICATIONS

European Search Report dated Nov. 3, 2006 including an English translation of the pertinent portions (Five (5) pages).

*Primary Examiner*—Lesley Morris
*Assistant Examiner*—Christopher E Veraa

(57) ABSTRACT

A license plate holder for a motor vehicle holds a vehicle license plate on the vehicle. The holder has a carrier plate to which the vehicle license plate can be fastened, and one or more devices for fastening the carrier plate to the vehicle in a license plate area provided for the vehicle license plate. Each fastening device has a base part fixedly arranged on the carrier plate and a securing part rotatably about a rotation axis arranged on the base part relatively thereto. Spaced away from the carrier plate, the securing part has at least one bracket radially projecting with respect to the rotation axis and can be swiveled about the rotation axis between a starting position and a securing position, whereby the at least one bracket 14 reaches behind a vehicle-fixed holding contour for fastening the carrier plate to the vehicle in the securing position.

4 Claims, 5 Drawing Sheets

U.S. PATENT DOCUMENTS

| | | | |
|---|---|---|---|
| 5,547,306 A * | 8/1996 | Zakrajsek | 403/202 |
| 5,581,852 A * | 12/1996 | Zakrajsek | 24/289 |
| 5,813,640 A * | 9/1998 | Koch et al. | 248/222.11 |
| 6,167,645 B1 | 1/2001 | Gasko et al. | |
| 6,497,003 B2 * | 12/2002 | Calabrese | 16/4 |
| 7,401,427 B2 * | 7/2008 | Zander | 40/200 |

FOREIGN PATENT DOCUMENTS

| | | |
|---|---|---|
| DE | 41 32 267 A1 | 4/1993 |
| DE | 295 01 956.5 U1 | 3/1995 |
| DE | 201 20 823 U1 | 5/2002 |

* cited by examiner

LICENSE PLATE HOLDER FOR A MOTOR VEHICLE

CROSS REFERENCE TO RELATED APPLICATIONS

This application claims the priority of DE 10 2005 033 873.9, filed Jul. 20, 2005, the disclosure of which is expressly incorporated by reference herein.

BACKGROUND AND SUMMARY OF THE INVENTION

The present invention relates to a license plate holder for a motor vehicle for holding a vehicle license plate on the vehicle, and also to a vehicle equipped with such a license plate holder.

In most countries, motor vehicles require permissions or licensing in order to being operated in highway or street traffic. For this purpose, the vehicle receives a vehicle license plate which is also called a number plate. For mounting the vehicle license plate, the vehicles are therefore equipped with at least one license plate area in which the respective vehicle license plate can be fastened to the vehicle. In principle, it is conceivable to fasten the respective vehicle license plate directly to the vehicle. However, in the case of modern vehicles, the use of a license plate holder of the initially mentioned type is customary. This type of license plate holder is fastened to the vehicle in the license plate area. The respective vehicle license plate is then fastened to this license plate holder and is therefore no longer directly fastened to the vehicle but only indirectly by way of the license plate holder.

U.S. Pat. No. 3,685,188 shows a vehicle license plate is known which is equipped with lockable fastening devices. By way of these fastening devices, the vehicle license plate can be fastened directly to the vehicle. The fastening devices are designed in the manner of closing cylinders which can be changed by a key between a locked position and on open position. In a first embodiment, pins are forced radially toward the outside in the locked position, whereby the latter reach behind a wall section of the vehicle. In the open position, these pins are radially adjusted so far toward the inside that the respective closing cylinder can be pulled out of the above-mentioned wall section. In a second embodiment, the closing cylinder is equipped with a radially projecting attachment which reaches behind a wall section of the vehicle in the locked position and, in the open position, is aligned with a slot which is arranged in the wall section and is shaped complementary to the attachment. Correspondingly, the closing cylinder can be pulled out of the above-mentioned wall in the open position. For implementing such a detachable fastening of the vehicle license plate on the vehicle, the vehicle is equipped with corresponding closing cylinder receiving devices in the license plate area, which closing cylinder receiving devices are visible when the vehicle license plate is removed.

The laws concerning the identification of vehicles may differ from one country to another. For example, different sizes of license plates may be required. Furthermore, the stipulated positioning of the respective license plate area on the vehicle may differ. The number of vehicle license plates to be mounted on the vehicle may also vary. In many countries, it is compulsory, for example, to mount one vehicle license plate respectively on the vehicle in the front as well as in the rear. Simultaneously, there are countries in which the vehicle does not have to have a vehicle license plate in the front. A license plate area, which is recognizable as such in countries in which it is not required, may impair the aesthetic impression of the vehicle.

The present invention addresses the problem of indicating an advantageous method of mounting vehicle license plates on the vehicle to simplify particularly a subsequent mounting of the license plate holder on the vehicle.

The present invention is based on the general recognition of equipping the license plate holder with at least one fastening device which, for fastening a carrier plate provided for mounting the vehicle license plate in the license plate area on the vehicle, has a securing part which is rotatably disposed on a base part of the fastening device and, in a securing position, reaches behind a holding contour fixed to the vehicle. In a starting position of the securing part, it is freed from the holding contour and is aligned with an opening, through which the securing part can be positioned relative to the holding contour. The license plate holder can thereby be subsequently mounted on the vehicle in a particularly simple manner. In this case, particularly vehicle-fixed areas which are situated on the vehicle anyhow, can be used as the holding contour. The vehicle-side expenditures for the implementation of a fastening possibility for the vehicle license plate by the license plate holder are therefore minimal. In addition, in the case of such an embodiment, the license plate area of the vehicle cannot be recognized as such when the license plate holder is absent.

According to an advantageous embodiment, the securing part can be fixed in its securing position by a screw on the base part in an axial manner with respect to the axis of rotation. The respective fastening device therefore comprises, in addition to the base part which is mounted on the carrier plate and the securing part, a third part, specifically the screw by way of which the two other parts are axially fastened to one another. The fastening device can thereby be implemented in an extremely cost-effective manner.

Other objects, advantages and novel features of the present invention will become apparent from the following detailed description of the invention when considered in conjunction with the accompanying drawings.

DETAILED DESCRIPTION OF THE DRAWINGS

Figure 1:
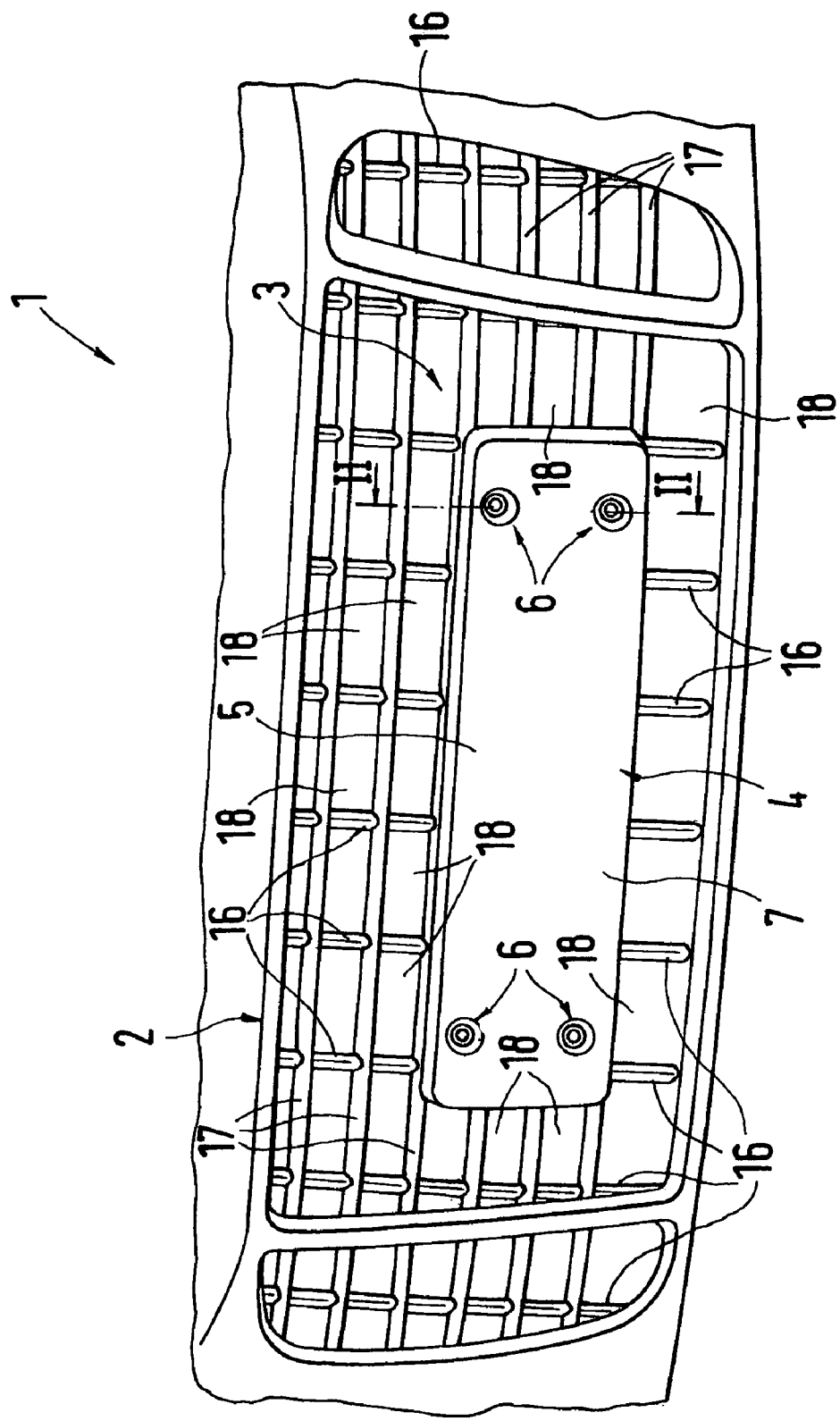
FIG. 1 is a simplified perspective top view of a motor vehicle in the area of a radiator grill.

Corresponding to FIG. 1, a vehicle 1, which need only be shown here in the area of its front-end radiator grill 2, comprises at least one license plate area designated generally by numeral 3. This license plate area 3 is used for mounting a known type of vehicle license plate (or number plate), which need not be shown here, on the vehicle 1. The mounting of the vehicle license plate on the vehicle 1 does not take place directly but indirectly by way of a license plate holder 4 that is fastened to the vehicle 1 in the license plate area 3. This license plate holder 4 comprises a carrier plate 5 as well as one or more fastening devices 6.

The carrier plate 5 has a front side 7 which, in the mounted condition, faces away from the license plate area 3, and (as better seen in FIG. 2) a rear side 8 which, in the mounted condition, faces the license plate area 3. The carrier plate 5 is dimensioned such that the respective vehicle license plate can be fastened to its front side 7. For the fastening of the vehicle license plate, the carrier plate 5 can be equipped with suitable fastening devices. For example, the vehicle license plate can be screwed, glued or snapped onto the carrier plate 5. In the illustrated preferred embodiment, several, specifically, four fastening devices 6 are provided in order to fasten the carrier plate 5 to the vehicle 1.

Figure 2:
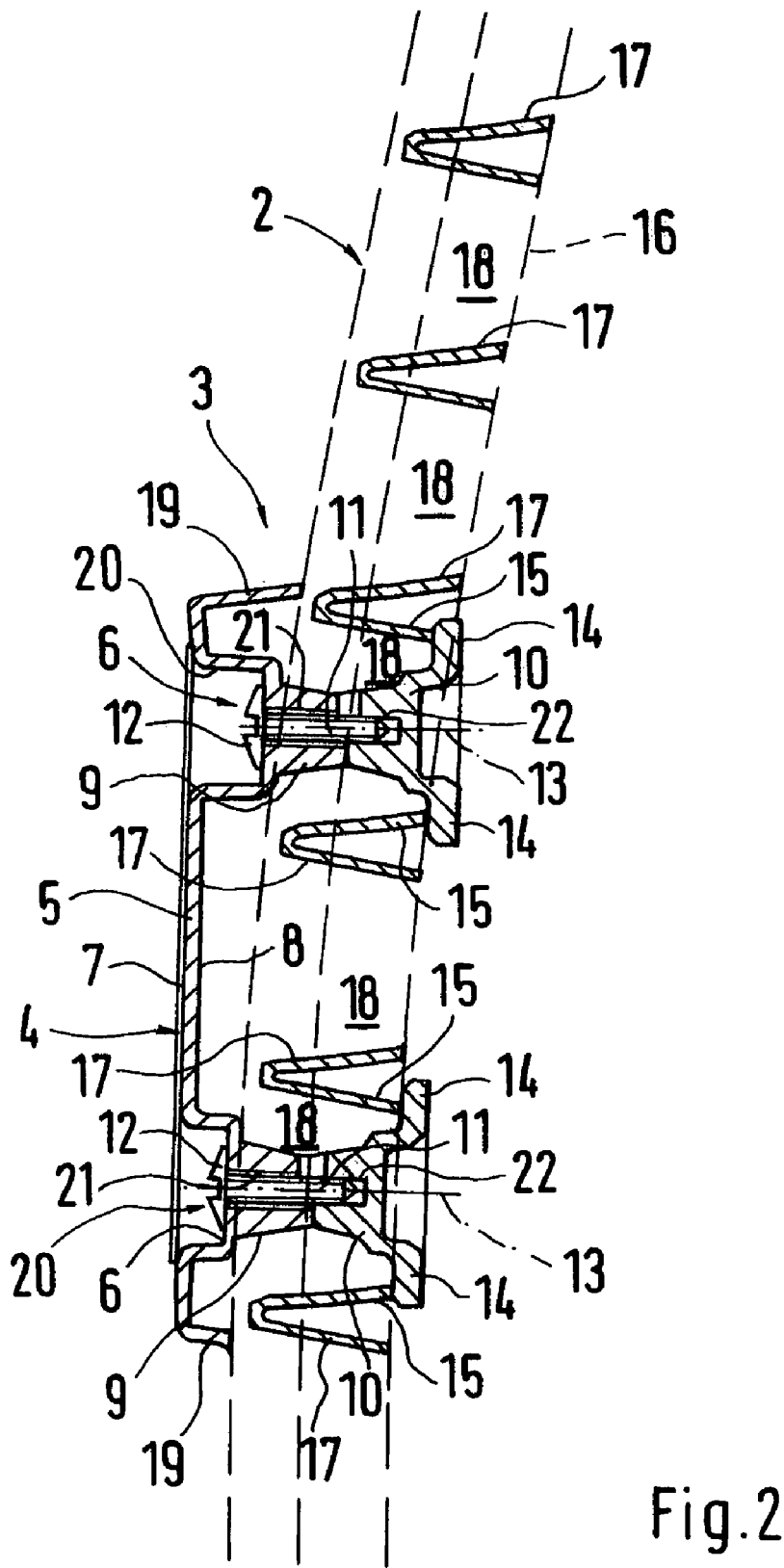
FIG. 2 is a simplified sectional view of a license plate holder along line II-II in FIG. 1.
Figure 3:
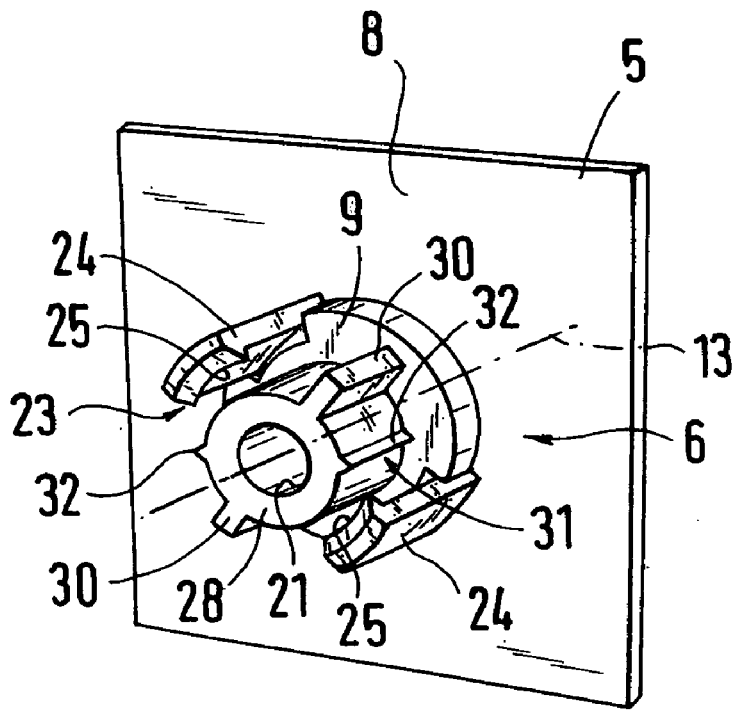
FIG. 3 is a schematic perspective view of a base part of a fastening device.

Referring to FIG. 2, each fastening device 6 comprises a base part 9 and a securing part 10. In addition, a screw 11 with a head 12 may be provided. The base part 9 is fixedly arranged on the carrier plate 5; in particular, it is produced in one piece therewith. The fastening devices 6 are constructed on the rear side 8 of the carrier plate 5 and project therefrom. Rotatably about an axis of rotation 13, the respective securing part 10 is arranged at the respective base part 9. At least in the mounted condition shown in FIG. 2, with respect to each fastening device 6, the securing part 10 is axially fixed relative to the base part 9 by the screw 11.

Spaced away from the carrier plate 5, the respective securing part 10 has at least one radially projecting bracket 14. In the illustrated embodiments, the securing part 10 has two such brackets 14 respectively which are diametrically arranged with respect to the rotation axis 13.

When the license plate holder 4 is not mounted on the vehicle, or when the securing part 10 is not fixed to the base part 9 by the screw 11, the respective securing part 10 can be swiveled about the rotation axis 13 relative to the base part 9 between a starting position and the securing position illustrated in FIG. 2. In the securing position, the brackets 14 each reach behind a vehicle-fixed holding contour 15 in order to fasten the carrier plate 5 to the vehicle 1 in this manner. This securing position of the securing part 10 can be secured by tightening of the screw 11. In this case, it is basically contemplated axially to brace the securing part 10 by the screw 11 on the base part 9 such that a sufficient antitwist protection of the securing part 10 is ensured. In addition or as an alternative, by tightening of the screw 11, the respective holding contour 15 can be axially clamped in between the brackets 14 and the carrier plate 5 such that, a sufficient antitwist protection results for the securing part 10.

The license plate area 3 is preferably provided on the radiator grill 2 or on a partial area of the radiator grill 2. The radiator grill 2 has several vertical webs 16 and several horizontal webs 17 which form a grid characteristic of the radiator grill 2. These struts 16, 17, particularly the horizontal struts 17, form the vehicle-fixed holding contour 15. The holding contour 15 is formed by rear side edges of the horizontal webs 17 facing away from the carrier plate 5. When the license plate holder 4 is absent, the license plate area 3 within the radiator grill 2 will not be visible. The holding contours 15 formed by the horizontal webs 17 are already present on the radiator grill 2, so that the license plate area 3 will not be recognizable when the license plate holder 4 is absent.

For the mounting and demounting of the license plate holder 4, the securing parts 10 can be rotated with respect to their base parts 9, preferably by approximately 90 degrees. The brackets 14 will then extend parallel to the horizontal webs 17 and, as a result, can be fitted particularly easily through the radiator slots 18. These radiator slots 18 are in each case framed by two adjacent vertical webs 16 and two adjacent horizontal webs 17 respectively.

Since the radiator grill 2 as a whole is available as a license plate area 3, it is basically contemplated to mount license place brackets 4 of different sizes on the radiator grill 2, which brackets are adapted to vehicle license plates of different sizes corresponding to legal stipulations.

Corresponding to FIG. 2, the radiator grill 2 may have a curvature at least on a side facing the license plate holder 4. The carrier plate 5 is adapted to this curvature on its rear side 8. An edge 19 of the carrier plate 5 projecting toward the rear on the rear side 8 may, for example, be longer at the top than at the bottom. Likewise, flush openings 20 may be deeper at the top than at the bottom. Through these flush openings 20, the respective screw 11 can be screwed through the base part 9 into the securing part 10, specifically such that, when the screw is tightened 11, the screw head 12 is arranged to be sunk in the flush opening 20. When the vehicle license plate is mounted on the license plate holder 4, the flush openings 20 are fully covered. As a result, the fastening devices 6 are invisible and inaccessible from the front.

In the mounted condition, the front side 7 of the carrier plate 5 preferably extends in a vertical plane, so that the vehicle license plate also can be mounted in a vertically plane manner.

FIG. 2 also indicates that the screws 11 each extend coaxially with respect to the respective rotation axis 13. In the process, the screws 11 penetrate a respective passage opening 21 constructed in the base part 9 by way their respective shafts (not shown in detail), and are screwed into a screw opening 22 constructed on the respective securing part 10. The screw heads 12 are accessible from the front side 7 of the carrier plate 5, so that the license plate holder 4 can be mounted on the vehicle 1 from the front to permit fast and simple mounting.

In the following description, additional characteristics of the fastening devices 6 will be explained in detail without limiting the generality by way of an embodiment corresponding to FIGS. 3 to 7.

The securing part 10 is preferably held at the base part 9 in a captive manner, specifically even if no screw 11 is screwed in. This captive condition can preferably be implemented by a clip connection 23 which axially secures the securing part 10 on the base part 9. This clip connection 23 is implemented here in that the base part 9 has at least one, as illustrated, two, clip arms 24 that project axially in the direction of the securing part 10 and are radially elastic. Radially on the inside, each clip arm 24 has a clip nose 25. In addition, the securing part 10 is equipped with two sleeve segments 26 which radially on the outside each have a clip contour 27. These clip contours 27 have configurations complementary to the clip noses 25 so that, when the securing part 10 is fitted in alignment with the rotation axis 13 onto the base part, the clip noses 25 reach behind the clip contours 27.

Furthermore, the base part 9 is equipped with a cylinder section 28 which projects coaxially with respect to the rotation axis 13 in the direction of the securing part 10. This cylinder section 28 contains the passage bore 21. The sleeve segments 26 of the securing part 10 can be fitted onto this cylinder section 28. When the screw 11 is absent, the securing part 10 is axially adjustably held on the base part 9, with the sleeve segments 26 together with the sleeve section 28 forming an axial guide.

Figure 4:
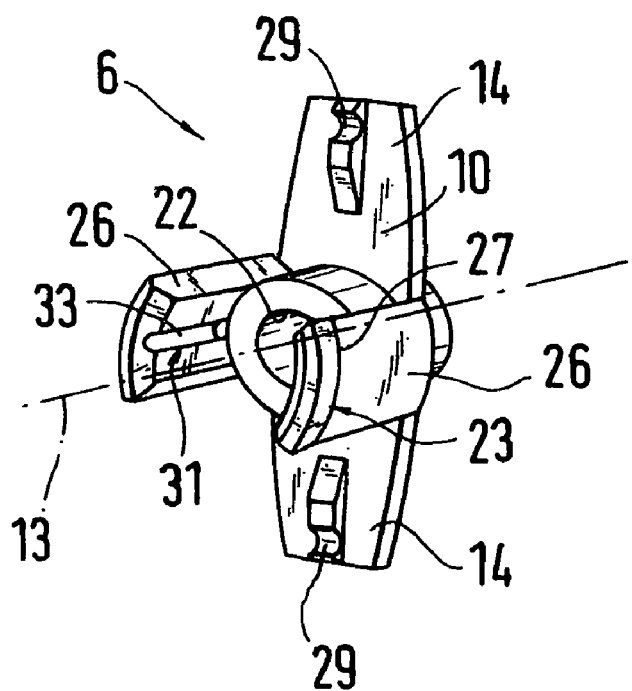
FIG. 4 is a schematic perspective view of a securing part of the embodiment according to FIG. 3.
Figure 5:
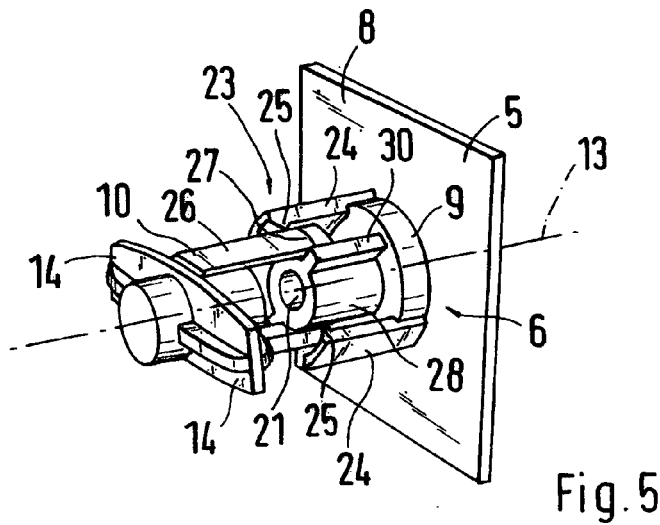
FIGS. 5 to 7 are schematic perspective views of the fastening device shown in FIGS. 3 and 4 under different conditions.

Referring to FIG. 4, the brackets 14 each have a contact surface 29 on an underside facing the base part 9. The contact surfaces 29 have a shape complementary to the holding contour 15. In this manner, the brackets 14 rest form lockingly against the holding contours in the mounted condition. The fastening devices 6 may each have one rotation stop respectively for the securing part 10 for the starting position and for the securing position.

In the embodiment shown in FIGS. 3 to 7, at least one axial web 30 may be provided on the cylinder section 28 for implementing these rotation stops. Two such axial webs 30 are preferably provided which are arranged to be diametrically opposite with respect to the axis of rotation 13. Each axial web 30 projects radially from the cylinder section 28 and extends parallel to the rotation axis 13. The sleeve segments 26 now interact with these axial webs 30 for forming the rotation stops. With respect to FIG. 5, in particular, in the starting position, the sleeve segments 26 come to rest in one rotating direction against the axial webs 30 and thereby form a rotation stop assigned to the starting position. With respect to FIGS. 6 and 7, in the securing position, the sleeve segments 26 come to rest in the counter-rotating direction against the axial webs 30 and thereby form the rotation stop assigned to the securing position.

Furthermore, the fastening devices 6 can be equipped with a rotation lock 31 assigned to the starting position. For implementing this rotation lock 31, referring to FIGS. 3 and 4, the cylinder section 28 can be equipped with at least one radially projecting detent nose 32. As illustrated, two such detent noses 32 are arranged diametrically opposite with respect to the rotation axis 13. These detent noses 32 extend, for example, parallel to the rotation axis 13 along the entire cylinder section 28. On their interior sides facing the cylinder section 28, the sleeve segments 26 each have a detent opening 33 that has a shape complementary to that of the respective detent nose 32; thus here, the shape of an axial longitudinal groove.

By way of the rotation lock 31, the starting position of the securing part 10 can be secured in the not yet mounted condition in order to simplify the mounting of the license plate holder 4. The rotation lock 31 is therefore dimensioned such that it is overcome when the screw 11 is screwed in. By way of a corresponding relative position between the starting position and the securing position, the securing part 10 can automatically be changed into the securing position by the screwing-in of the screw 11.

The mounting of the license plate holder 4 on the vehicle is carried out as follows. For preparing the license plate holder 4, the securing parts 10 are fitted onto the base parts 9 and are changed into the starting position shown in FIG. 5. In this starting position, the securing parts 10 can be secured by the above-described rotation lock 31. Furthermore, this relative position is defined by the rotation stop assigned to the starting position. The rotation stop comprises the axial webs 30 and the sleeve segments 26 interacting therewith. The securing part 10 is freely movable on the base part 9 in the axial direction but is held on the base part 9 in a captive manner by the clip connection 23.

Figure 6:
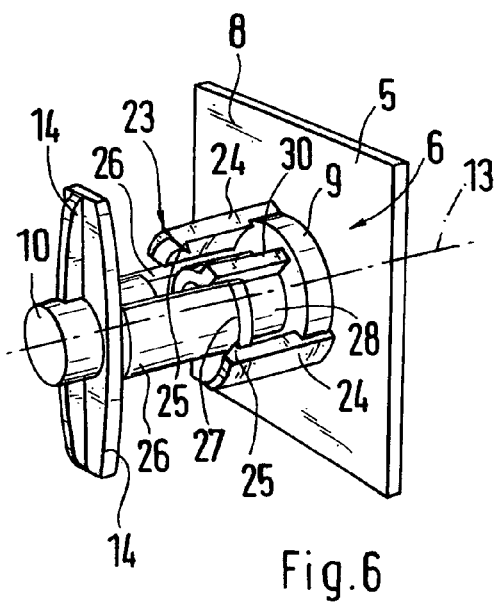

After the positioning of the license plate holder 4 in the license plate area 3, for example, by introducing the fastening devices 6 in the radiator slots 18, the screws 11 are screwed from front side 7 of the carrier plate 5 through the passage openings 21 into the screw openings 22 of the securing parts 10. When the screws 11 are tightened, the holding force of the rotation lock 31 is overcome. As a result, the securing part 10 rotates along with the screw 11 until the securing part 10 reaches its securing position. When swiveling into the securing position, the brackets 14 reach behind the holding contour 15 of the vehicle. This relative position is defined by the rotation stop assigned to the securing position. This rotation stop is comprised of the interaction of the axial webs 30 and the sleeve segments 26 as illustrated in FIG. 6.

Figure 7:
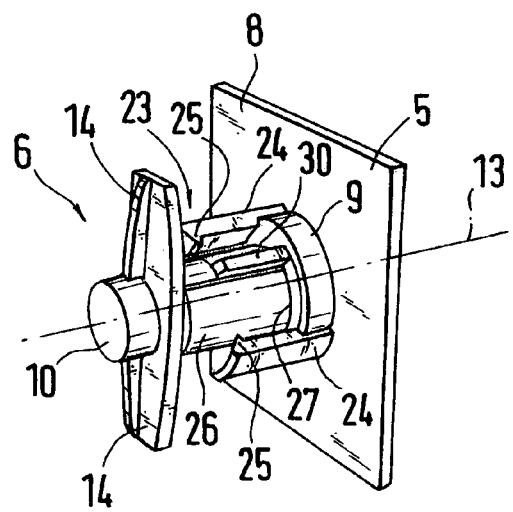
Figure 8:
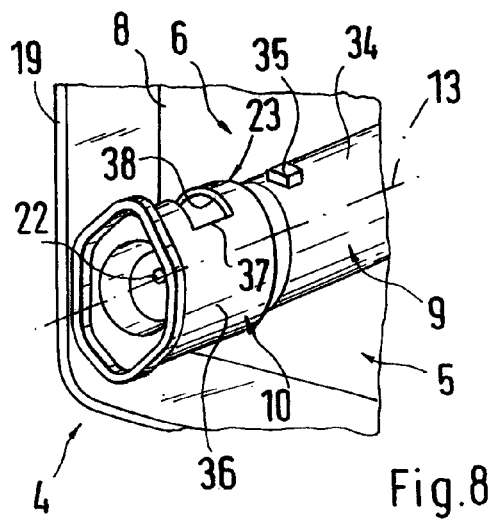
FIGS. 8 to 11 are schematic perspective views of another embodiment of fastening device under different conditions similar to that illustrated in FIGS. 5 and 7.
Figure 9:
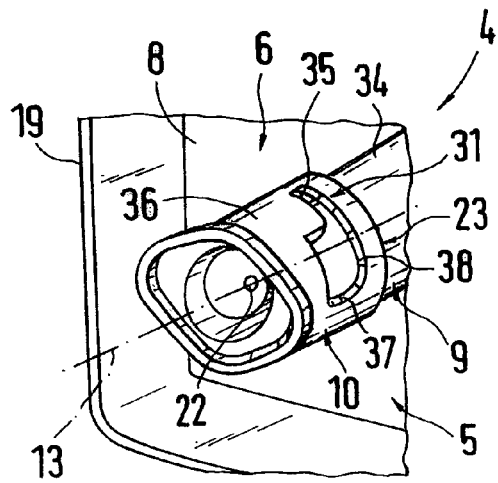
Figure 10:
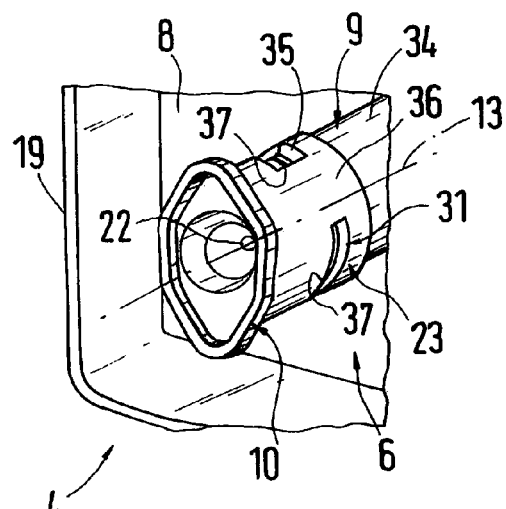
Figure 11:
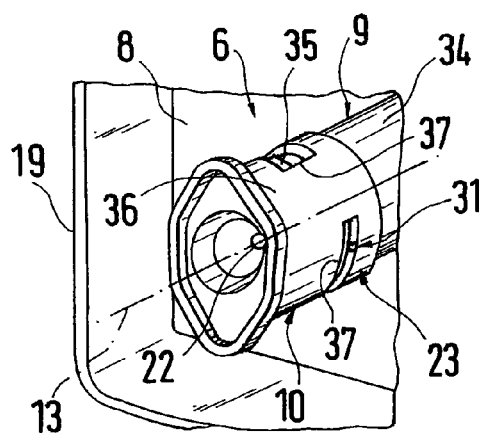

Because the securing part 10 is secured in the securing position by the rotation stop, a further screwing-in of the screw will have the result that the securing part 10 moves axially toward the base part 9. As a result, the holding contour 15 is clamped in between the brackets 14 and the carrier plate 5. In this case, it is basically contemplated to screw the securing part 10 tight up to the axial contact with the base part 9. FIG. 7 shows the end condition in which the securing 10 has maximally axially approached the base part 9.

In another embodiment of the fastening devices 6 illustrated in FIGS. 8 to 11, the respective base part 9 is equipped with a cylinder 34 which extends coaxially with respect to the rotation axis 13. This cylinder 34 has at least one projection 35 which projects radially from the cylinder 34. Preferably, two such projections 35 are provided which are arranged diametrically opposite on the cylinder 34. The securing part 10 has a sleeve 36 which can be fitted on the outside onto the cylinder 34. For each projection 35, the sleeve 36 contains a connecting link guide 37 in the form of an axially and circumferentially limited recess of the sleeve 36. When the sleeve 36 is fitted onto the cylinder 34, the respective projection 35 projects radially into the respective connecting link guide 37. In this manner, the securing part 10 is held in a captive manner on the base part 9 and, in addition, is limited with respect to its rotatability about the rotation axis 13.

In order to simplify the fitting of the sleeve 36 onto the cylinder 34, the sleeve 36 can be provided with a lead-in bevel 38. The latter is constructed on a wall section away from the brackets 14 and bounding the connecting link opening 37. This lead-in bevel 38 is arranged such that the securing part 10 has to be aligned into a fitting-on position relative to the base part 9 for fitting the sleeve 36 onto the cylinder 34. The fitting-on position is situated between the starting position and the securing position. In addition, the above-mentioned wall section of the connecting link opening 37 interacts with the projection 35 for forming an axial clip connection 23.

The connecting link openings 37 are preferably dimensioned such that they interact with the projections 35 for forming a rotation stop assigned to the starting position. Furthermore, the connecting link guides and the projections 35 may form a rotation lock 31 assigned to the starting position or a corresponding other arrangement which secures the starting position when the screw 11 is absent. Corresponding to FIGS. 10 and 11, the connecting link openings 37 may interact with the projections also for forming a rotation stop assigned to the securing position.

The embodiment illustrated in FIGS. 8 to 11 operates analogously to the embodiment illustrated in FIGS. 3 to 7. Reference can therefore be made in this respect to the above description of the operation, with respect to the functionality, with the conditions of FIGS. 5 to 7 corresponding to the conditions of FIGS. 9 to 11.

It should also be clear to one skilled in the art that individual characteristics or groups of characteristics of the one embodiment corresponding to FIGS. 3 to 7 can be combined with and/or exchanged for individual characteristics and groups of characteristics of the other embodiment corresponding to FIGS. 8 to 11 within the scope of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A license plate holder for a motor vehicle for holding a vehicle license plate on a motor vehicle, comprising:
   a carrier plate to which the vehicle license plate is fastenable, the carrier plate having a front side and a rear side,
   at least one fastening device for fastening the carrier plate to the motor vehicle in a license plate area provided for the license plate, and
   a screw having a screw head, wherein
   the respective fastening device has a base part fixedly arranged on the carrier plate, and a securing part arranged on the base part relatively thereto rotatably about a rotation axis,
   the securing part has, spaced away from the carrier plate, a bracket radially projecting with respect to the rotation axis,
   the securing part being swivelable about the rotation axis between a starting position and a securing position,
   when the carrier plate is fixed to the vehicle, a fixed holding contour of the vehicle is axially clamped between the bracket and the carrier plate, and the securing part is in the securing position,
   the bracket has a contact surface shaped complementary to the holding contour and the securing part is axially fixed in the securing position on the base part by the screw,
   the screw extends coaxially with respect to the rotation axis,
   the screw head of the screw is accessible for turning the screw on the front side of the carrier plate,
   the base part projects from the carrier plate on the rear side of the carrier plate that faces the license plate area in a mounted condition of the license plate holder, and
   before the screw is tightened, the screw axially displaceably holds the securing part on the base part.

2. The license plate holder according to claim 1, wherein:
   the license plate area is provided on at least a portion of a radiator grill or another opening with vertical webs and horizontal webs,
   the holding contour is formed by webs of the radiator grill,
   the starting position and the securing position are rotated by 90° with respect to one another, and
   the rear side of the carrier plate facing the radiator grill is adapted to a curvature of a side of the radiator grill facing the carrier plate.

3. The license plate holder according to claim 1, wherein: the base part has a passage opening for the screw.

4. The license plate holder according to claim 1, wherein the base part and the securing part are clipped together.

* * * * *